United States Patent [19]
Mineo

[11] Patent Number: 5,827,096
[45] Date of Patent: Oct. 27, 1998

[54] WATERCRAFT EXHAUST CONTROL

[75] Inventor: Shigeharu Mineo, Iwata, Japan

[73] Assignee: Yamaha Hatsudoki Kabushiki Kaisha, Japan

[21] Appl. No.: 847,830

[22] Filed: Apr. 17, 1997

[30] Foreign Application Priority Data

Apr. 18, 1996 [JP] Japan ................................. 8-097160

[51] Int. Cl.$^6$ ................................................. B63H 21/32
[52] U.S. Cl. ........................................................... 440/89
[58] Field of Search ............................... 440/75, 88, 89; 60/309, 310, 290

[56] References Cited

U.S. PATENT DOCUMENTS

| | | | |
|---|---|---|---|
| 4,023,353 | 5/1977 | Hall | 440/89 |
| 4,202,297 | 5/1980 | Oku et al. | |
| 4,364,346 | 12/1982 | Shiohara | |
| 4,773,215 | 9/1988 | Winberg et al. | 440/89 |
| 5,063,887 | 11/1991 | Ozawa et al. | |
| 5,063,888 | 11/1991 | Ozawa et al. | |
| 5,078,631 | 1/1992 | Harbert | 440/89 |
| 5,433,165 | 7/1995 | McGuiness et al. | 114/357 |

FOREIGN PATENT DOCUMENTS

4-201797  7/1992  Japan ........................................ 440/89

*Primary Examiner*—Stephen Avila
*Attorney, Agent, or Firm*—Knobbe, Martens, Olson & Bear, LLP

[57] ABSTRACT

An exhaust control for an internal combustion engine powering a watercraft is disclosed. The exhaust control includes a valve which is movably mounted with respect to the engine and having a portion for extension into an exhaust passage thereof. Preferably, the valve is of the sliding type. A motor is connected to the hull of the watercraft near a maintenance opening in the top of the watercraft. In one embodiment, a pulley is mounted to the output shaft of the motor and to a shaft which is movably connected to the valve, and a looping cable extends around the pulleys. In a second embodiment, a cable has its first end connected to the output shaft of the motor and its second end connected to the valve, and a spring engages the valve, biasing it in one direction.

25 Claims, 9 Drawing Sheets

WATERCRAFT EXHAUST CONTROL

FIELD OF THE INVENTION

The present invention relates to an exhaust control. More particularly, the invention is an exhaust control for an engine of the type powering a personal watercraft.

BACKGROUND OF THE INVENTION

Internal combustion engines include exhaust control mechanisms for controlling the flow of exhaust from each combustion chamber of the engine. In most instances, these mechanisms comprise valves.

Sometimes the valves are of the seating variety, moving between one position in which the valve completely closes an opening in the combustion chamber wall leading to an exhaust passage, and a second position in which exhaust is allowed to flow through the opening. These valves are often operated by a camshaft positioned at the end of a stem of the valve. As the camshaft rotates, the stem of the valve is selectively engaged, pressing it at certain times in a direction which forces the head of the valve out of the exhaust passage opening. A spring returns the valve to its original position.

In those instances where the engine operates on a two-stroke or two-cycle principal, the valve may be of the sliding or rotating type. Generally, this type of valve does not serve to ever completely close the opening in the combustion chamber wall or the exhaust passage. Instead, the valve moves between a first position in which the valve is recessed and does not obstruct the flow of exhaust from the combustion chamber, and a second position in which the valve partly obstructs the passage. This type of valve is advantageous over the poppet or seating type valve because it may move much more quickly, and because the seating type valve is not adapted to close only a portion of the exhaust passage.

On the other hand, the sliding or rotating type valve suffers partly in its reliability. The rotating valve may seize within the passage in which it is mounted and providing lubricant to the valve to prevent seizing is difficult because it is location in a high temperature profile area of the engine. Further, a reliable means for actuating the rotating or sliding type valve is necessary to ensure proper engine operation. The presence of water within the engine compartment and watercraft vibration may damage the actuator to the point of failure, or at least significantly shorten its useful life.

An exhaust control for an engine of the type utilized to power a watercraft which is reliable and easy to maintain is desired.

SUMMARY OF THE INVENTION

In accordance with the present invention there is provided an exhaust control for an engine powering a watercraft having a hull. The exhaust control is adapted for use with an internal combustion engine having at least one combustion chamber with an exhaust passage leading therefrom for routing exhaust from the combustion chamber.

The exhaust control includes an exhaust valve for controlling the flow of exhaust. The valve is preferably of the sliding type, having a plate-like body and a stem extending therefrom. The valve is movably mounted with respect to the engine so that the body is movable into the exhaust passage.

In addition, means for actuating the valve are provided remote from the engine. In the preferred embodiment, the means for actuating comprises a motor connected to a wall of the hull of the watercraft.

The means for actuating further comprises a transmission mechanism for transmitting movement of the motor to the valve. In a first embodiment, the stem of the valve is connected to a shaft which is rotatably mounted with respect to the engine. A drive pulley is mounted on the output shaft of the motor, and a follower pulley is connected to the shaft of the valve. A looped cable extends around the pulleys.

In a second arrangement, the stem is spring-biased into a position in which the valve body extends into the exhaust passage. A cable has its first end connected to the output shaft of the motor and its second end connected to the stem of the valve body, whereby actuation of the motor causes the valve to selectively be retracted from the exhaust passage.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

The present invention is an exhaust control for an engine of the type utilized to power a watercraft, and more particularly, a personal watercraft.

Figure 1:
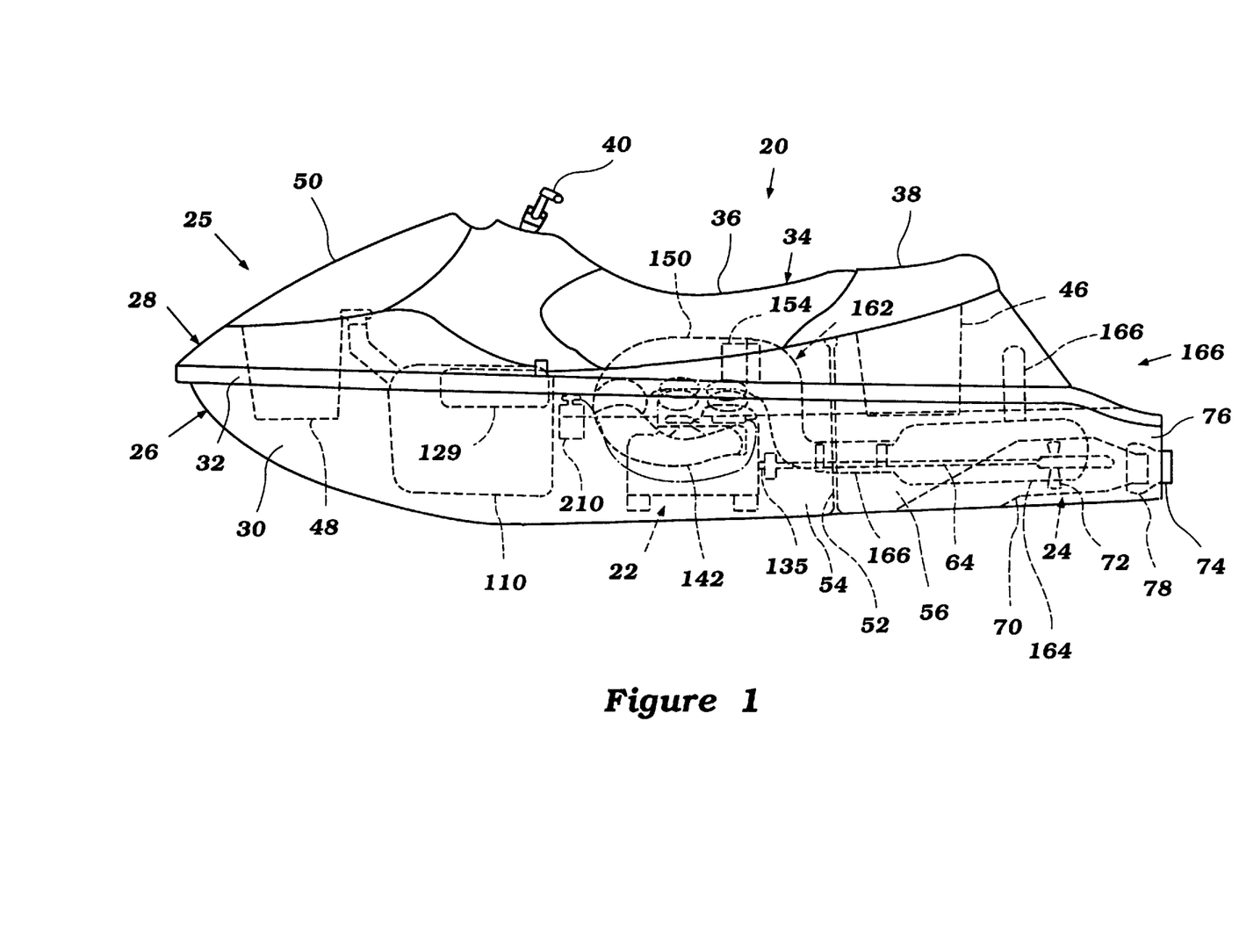
FIG. 1 is a side view of a personal watercraft of the type powered by an engine having an exhaust control in accordance with the present invention, the engine and other watercraft components positioned within the watercraft illustrated in phantom.
Figure 2:
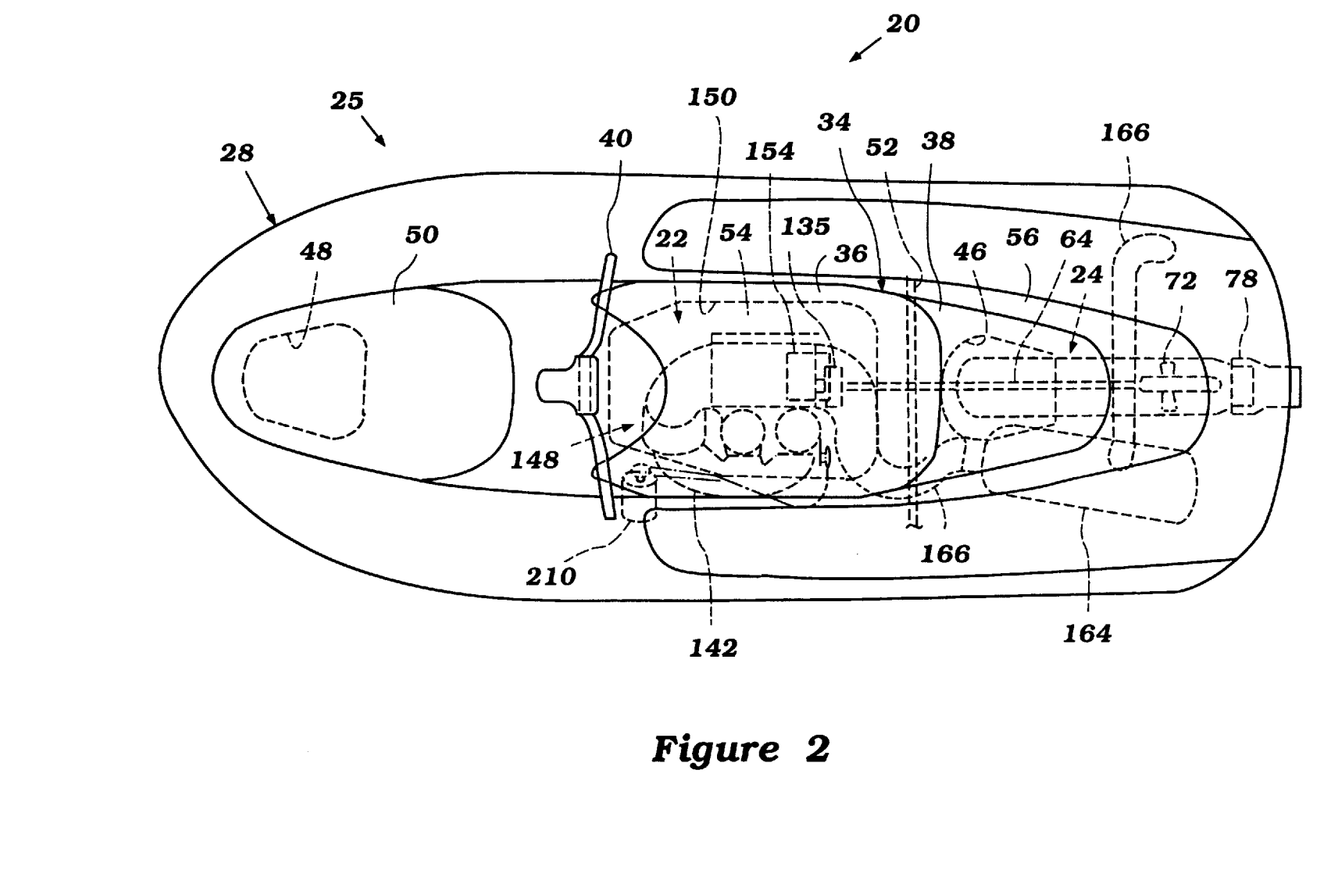
FIG. 2 is a top view of the watercraft illustrated in FIG. 1, with the engine and other watercraft components positioned within the watercraft illustrated in phantom.

FIGS. 1 and 2 illustrate a watercraft 20 having a watercraft body 25 comprising a hull 26 having a top portion or deck 28 and a lower portion 30. A gunnel 32 defines the intersection of the lower portion 30 and the deck 28.

A seat 34 comprising a front seat 36 and a rear seat 38 is positioned on the top portion 28 of the hull 26. The front seat 36 is preferably connected to a first removable deck member. The rear seat 38 is preferably connected to a second removable deck member. A steering handle 40 is provided adjacent the front seat 32 for use by a user in directing the watercraft 20.

Figure 3:
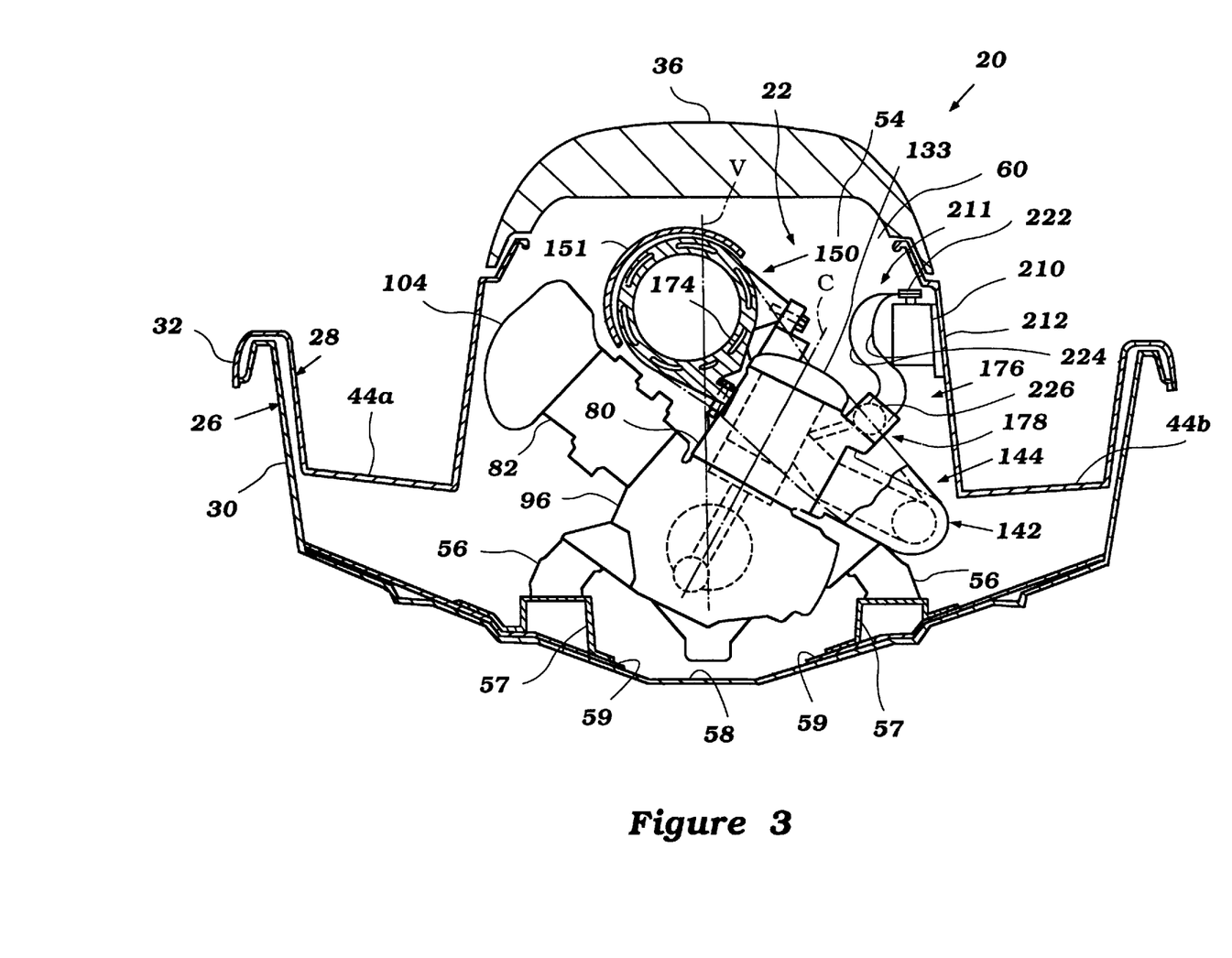
FIG. 3 is a cross-sectional end view of the watercraft illustrated in FIG. 1, illustrating the engine therein and a portion of the exhaust system in cross-section.

As best illustrated in FIG. 3, a bulwark extends upwardly along each side of the watercraft 20. A foot step area 44a,b is defined between each seat 36,38 and its adjacent bulwark.

As illustrated in FIGS. 1 and 2, the watercraft 20 includes a pair of storage boxes 46,48. A rear storage box 46 is preferably positioned underneath the rear seat 38 and is accessible by removing the second removable deck member. The front storage box 48 is preferably a recessed area in the top or deck portion 28 of the hull 26 at the bow of the craft, and includes a cover or hatch 50 selectively extendible over the storage box 48 for protecting the items therein from water and the like.

The top and bottom portions 28,30 of the hull 26, along with a bulkhead 52, define an engine compartment 54 and a pumping chamber 56. The engine 22 is positioned in the engine compartment 54. As best illustrated in FIG. 3, the engine 22 is connected to the hull 26 via several engine mounts 56 connected to a bottom 58 of the lower portion 30 of the hull 26. The mounts 56 are connected to upwardly extending supports 57 which are connected to reinforced sections 59 of the bottom 58 of the lower portion 30 of the hull 26. The engine 22 is preferably partially accessible through a maintenance opening 60 accessible by removing the first removable deck member on which the front seat 36 is mounted.

The engine 22 has a crankshaft 62 (see FIG. 6) which is in driving relation with an impeller shaft 64. The impeller shaft 64 rotationally drives a means for propelling water of a propulsion unit 24, which unit extends out a stem portion 66 of the watercraft 20 (see FIG. 1).

The propulsion unit 24 includes a propulsion passage 70 having an intake port which extends through the lower portion 30 of the hull 28. The means for propelling water, preferably an impeller 72 driven by the impeller shaft 64, is positioned in the passage 70. The passage 70 also has an outlet 74 is mounted within a chamber 76 and has its discharge positioned within a nozzle 78. The nozzle 78 is mounted for movement up and down and to the left and right, whereby the direction of the propulsion force for the watercraft 20 may be varied.

Figure 4:
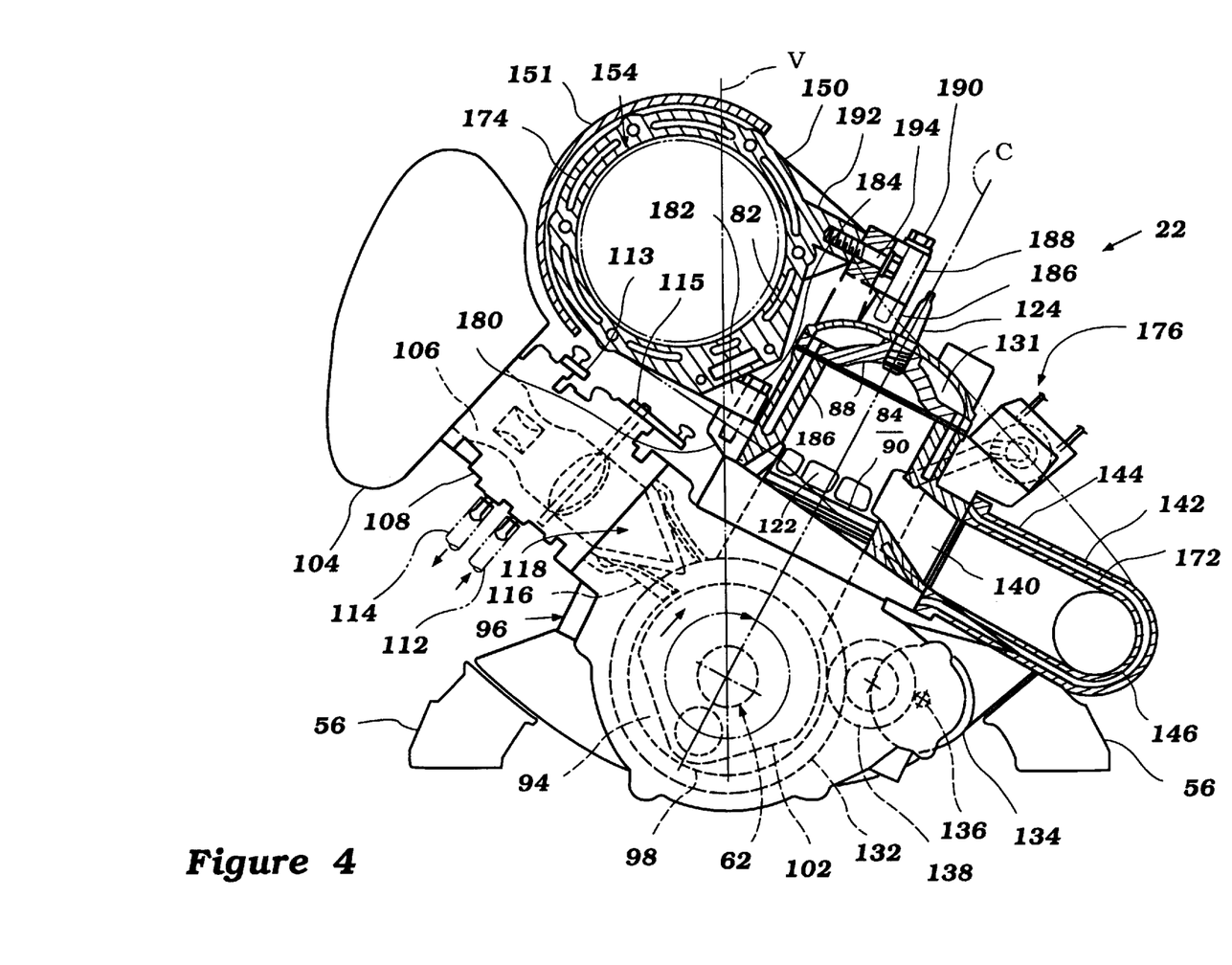
FIG. 4 is a cross-sectional end view of the engine illustrated in FIG. 3.
Figure 5:
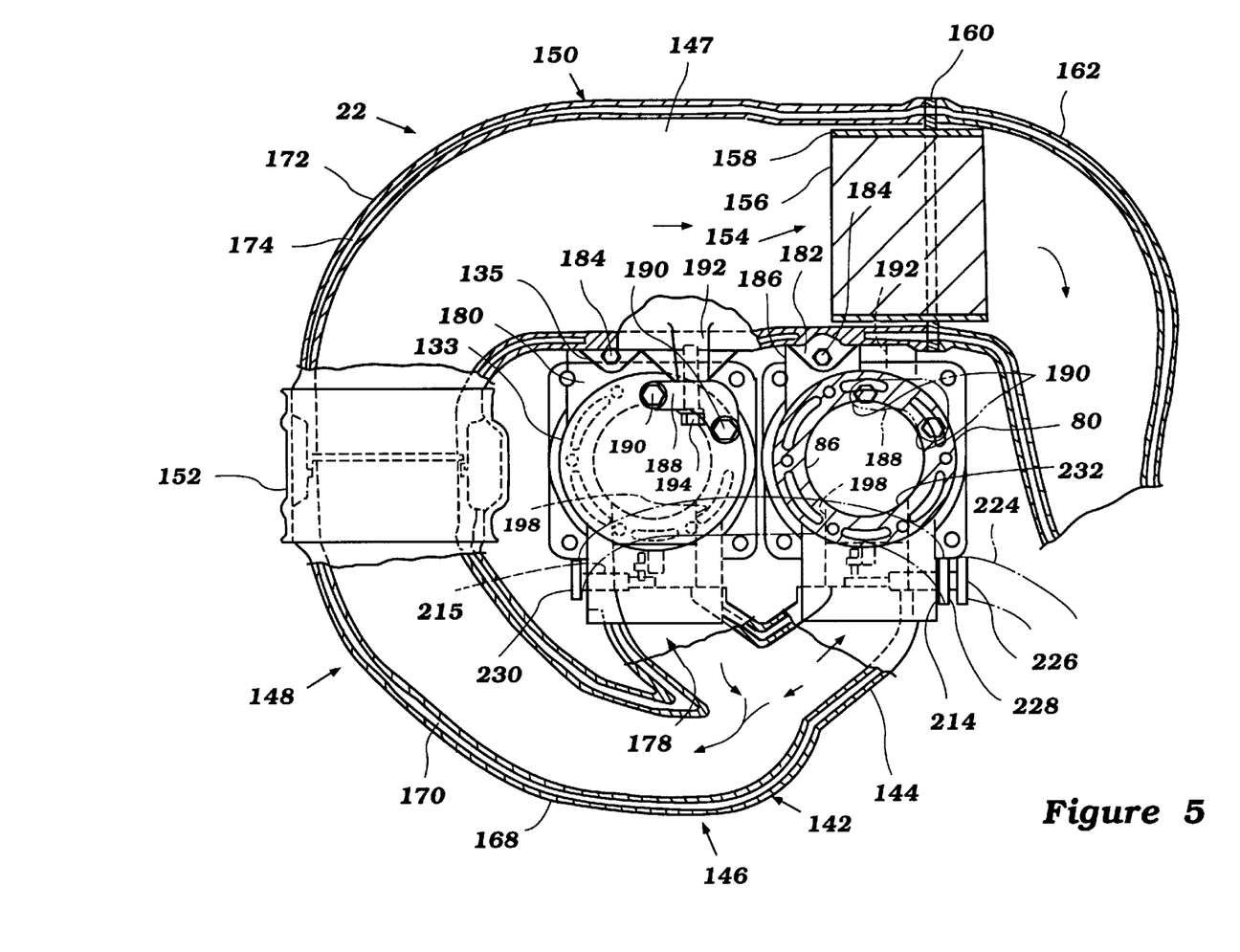
FIG. 5 is a cross-sectional top view of the engine illustrated in FIG. 3.

The engine 22 is best illustrated in FIGS. 3–5. As illustrated therein, the engine 22 is preferably of the two-cylinder, two-cycle variety. Of course, the engine 22 may have as few as one, or more than two, cylinders, as may be appreciated by one skilled in the art.

The engine 22 includes a cylinder block 80 having a cylinder head 82 connected thereto and cooperating therewith to define two combustion chambers 84 defined by cylinder walls 86 within the block 80 and a recessed area 88 in the cylinder head 82. A piston 90 is movably mounted in each combustion chamber, and connected to the crankshaft 62 via a connecting rod 92, as is well known in the art. Preferably, the engine 22 is tilted so that the combustion chambers 84 have a centerline C which is offset in a first direction from a vertical axis V. As is well known in the art, this arrangement keeps the vertical profile of the engine small, allowing the watercraft 20 to be designed with a low center of gravity.

The crankshaft 62 is rotatably journalled by a number of sealed bearings 100 with respect to the cylinder block 80 within a crankcase chamber 94. Preferably, the chamber 94 is defined by a crankcase cover member 96 which extends from a bottom portion of the cylinder block 80. The crankshaft 62 has pin portions 98 extending between web portions 102, with each connecting rod 92 connected to one of the pin portions 98.

As best illustrated in FIG. 4, the engine 22 includes means for providing an air and fuel mixture to each combustion chamber 84. Preferably, air is drawn into the engine compartment 54 through one or more air inlets in the hull 26. Air is then drawn into a silencer 104 and delivered to a venturi passage 106 in a carburetor 108.

Fuel is provided to the incoming air. In particular, fuel is drawn from a fuel tank 110 (see FIG. 1) positioned in the engine compartment 54, by a fuel pump (not shown), and delivered through a fuel delivery line 112 to the carburetor 108. A throttle and choke control (not shown) is preferably provided for allowing the watercraft operator to control the rate of fuel and air delivery to the engine 22 for controlling the speed and power output of the engine via a throttle linkage 113 and choke linkage 115 of the carburetor 108, as illustrated in FIG. 4. Fuel which is delivered to the carburetor 108 but not delivered to the air flowing therethrough may be returned to the fuel tank 110 through a return line 114.

It is contemplated that the fuel may be provided by indirect or direct fuel injection, as well as via carburation, as known in the art.

The air and fuel mixture selectively passes through an intake port 116 into the crankcase chamber 94 as controlled by a reed valve 118, as is known in the art. As is also well known, an intake port 116 and corresponding reed valve 118 are preferably provided corresponding to each combustion chamber 84. The crankcase chamber 94 is compartmentalized so as to provide the crankcase compression feature for each combustion chamber as is well known in the operation of two-cycle engines.

The fuel and air charge within the crankcase chamber 94 is delivered to each combustion chamber 84 through a scavenge passage 120 leading to a number of scavenge ports 122 in the cylinder wall 86.

A suitable ignition system is provided for igniting the air and fuel mixture provided to each combustion chamber. Preferably, this system comprises a spark plug 124 (see FIG. 4) corresponding to each combustion chamber. The spark plugs are preferably fired by a suitable ignition system.

Figure 6:
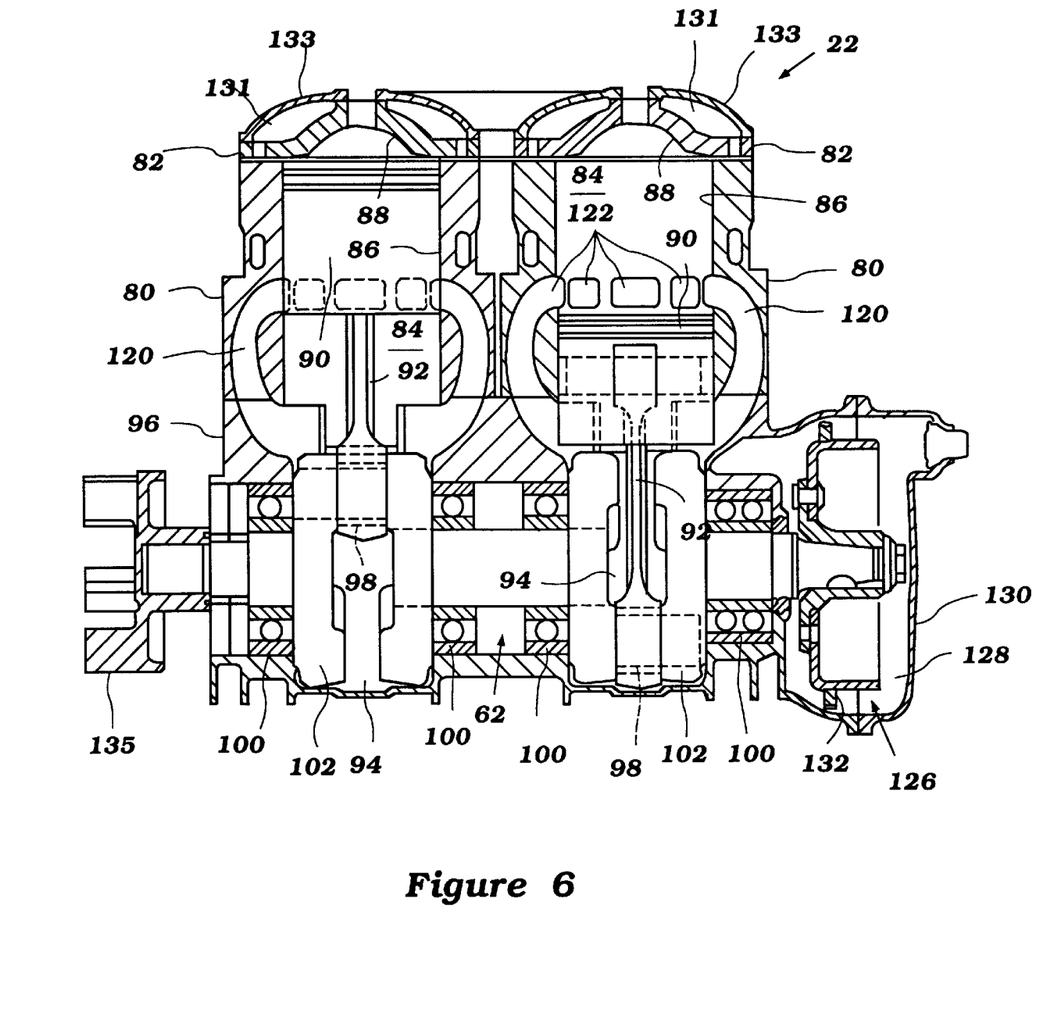
FIG. 6 is a cross-sectional side view of the engine illustrated in FIG. 3.

As illustrated in FIG. 6, a flywheel 126 is connected to one end of the crankshaft 62 within a chamber 128 defined by the crankcase cover 96 and a cover 130. The flywheel 126 preferably has a number of magnets thereon for use in a pulser-coil arrangement for generating firing signals for the ignition system. In addition, the ignition system may include a battery for use in providing power to an electric starter and other electrical engine features.

A number of teeth 132 are mounted on the periphery of the flywheel 126 for use in starting the engine 22 with a starter motor 134. In particular, as illustrated in FIG. 4, the starter motor is positioned near the bottom 58 of the hull 26. The starter motor 134 drives a drive gear 136. The drive gear 136 turns an intermediate gear 138 positioned between the drive gear and the flywheel 126.

The engine 22 includes a lubricating system for providing lubricating oil to the various moving parts thereof. Preferably, the lubricating system includes an oil tank or reservoir 129 (see FIG. 1) from which lubricating oil is delivered to and circulated throughout the engine, as is well known to those skilled in the art.

The engine 22 also preferably includes a suitable cooling system. Preferably, the cooling system is a liquid cooling system which draws cooling water from the body of water in which the watercraft 20 is being operated and circulates it through various cooling waterjackets 131 in the cylinder block 80, head 82, and between the cylinder head 82 and a head cover 133 (see FIGS. 4–7). The cover 133 may be connected to the cylinder head 82 via a number of bolts 135 (see FIG. 5).

As stated above, the crankshaft 62 drives the impeller 72 of the propulsion unit 24. Referring to FIG. 1, the end of the crankshaft 62 extends through the crankcase cover to a coupling 135 where it is coupled to an end of the impeller shaft 64.

Exhaust gas generated by the engine 22 is routed from the engine to a point external to the watercraft 20 by an exhaust system which includes an exhaust passage 140 leading from each combustion chamber 84 through the cylinder head 82. An exhaust manifold 142 is connected to a side of the engine 22. The manifold 142 has a pair of branches 144 with passages leading therethrough aligned with the passages 142 leading through the cylinder head 82. Exhaust generated by each combustion chamber is routed through the passage 140 to the manifold 142.

The branches 144 of the manifold 142 merge at a merge pipe portion 146 of the manifold which curves around the front end of the engine 22. The merge pipe portion 146 has a passage 148 through which the exhaust is routed.

An expansion pipe 150 is connected to the exhaust manifold 142, preferably via a flexible sleeve 152. The expansion pipe 150 has an enlarged passage or chamber 147 through which exhaust routed from the passage 148 in the exhaust manifold flows. As best illustrated in FIGS. 3 and 4, a protective plate 151 may be positioned over the top surface of the expansion pipe 150 to prevent the operator from touching the pipe 150 (which may be very hot) when reaching into the engine compartment 54.

A catalyst 154 is positioned within the expansion pipe 150. The catalyst 154 preferably comprises a flow-through type honeycomb catalyst bed portion 156 mounted within a housing 158 and connected to the expansion pipe 150 via a flange 160. The housing 150 is a generally cylindrical member having its first and second ends aligned with the flow path through the passage 147. The bed portion 156 of the catalyst is arranged in the housing 150 so that the exhaust flows therethrough.

After flowing through the catalyst 154, the exhaust flows into an upper exhaust pipe section 162 of the exhaust system. This portion of the exhaust system is tapers to a smaller diameter from that of the expansion pipe 150. This exhaust pipe 162 leads to a water lock 164. The exhaust pipe 162 is preferably connected to the water lock 164 via a flexible fitting, such as a rubber sleeve 166. The exhaust flows through the water lock 164, which is preferably arranged as known to those skilled in the art, and then passes to a lower exhaust pipe 166 which has its terminus in the chamber 76. In this manner, exhaust flows from the engine 22 through the exhaust system to its discharge within the water flowing through the chamber 76.

As a portion of the cooling system, and as best illustrated in FIG. 5, a cooling jacket is preferably provided for cooling the exhaust system. As illustrated, a sleeve 168 preferably extends around the exhaust manifold 144, cooperating with the manifold to create a cooling jacket 170. A similar sleeve 172 preferably extends around the expansion pipe 150, including the exhaust pipe section 162, cooperating therewith to form a cooling jacket 174. Preferably, the cooling jackets 172,174 are in fluid communication through the sleeve 152, whereby coolant introduced into the jacket 172 may flow to jacket 174 and on to a coolant discharge.

Preferably, the expansion pipe 150 is connected to the engine 22 for supporting it across the top of the engine, as illustrated in FIG. 4. As illustrated, a lower boss 180 extends outwardly (opposite the exhaust manifold 144) from the cylinder block 80. A lower flange or bracket 182 extends from the expansion pipe 150 and is connected to the lower boss 180 via a bolt 184.

Similarly, an upper boss 186 extends upwardly from the cover 133. A bracket 188 is connected to the boss via bolts 190. An upper bracket 192 extends from the expansion pipe 150 (above the lower bracket) and is connected to the bracket 188 via a bolt 194. Preferably, as illustrated in FIG. 5, the expansion pipe 150 is connected between its ends to the engine 22 via a pair of these upper and lower mountings.

Means are provided for controlling the flow of exhaust gases through the exhaust passages 140 from the combustion chambers 84. Preferably, this means comprises an exhaust control device 176. The exhaust control device 176 comprises a sliding knife type valve 178 and means for moving the valve.

Figure 8:
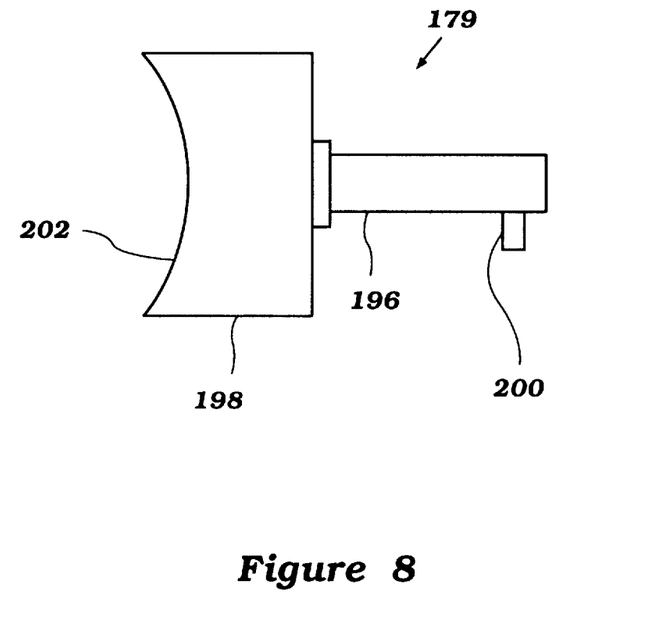
FIG. 8 is a side view of a valve body of the exhaust control illustrated in FIG. 7.

As illustrated in FIG. 8, the valve 178 has a body 179 with an elongate stem 196 with a plate 198 connected at one end and a pin 200 at the other. The plate 198 is flat, and includes a generally circular cut-out edge 202 opposite the stem 196. The edge 202 is shaped such that when the body 179 valve 178 is retracted, the edge 202 cooperates with the cylinder block 80 to define a smooth exhaust passage 140.

Figure 7:
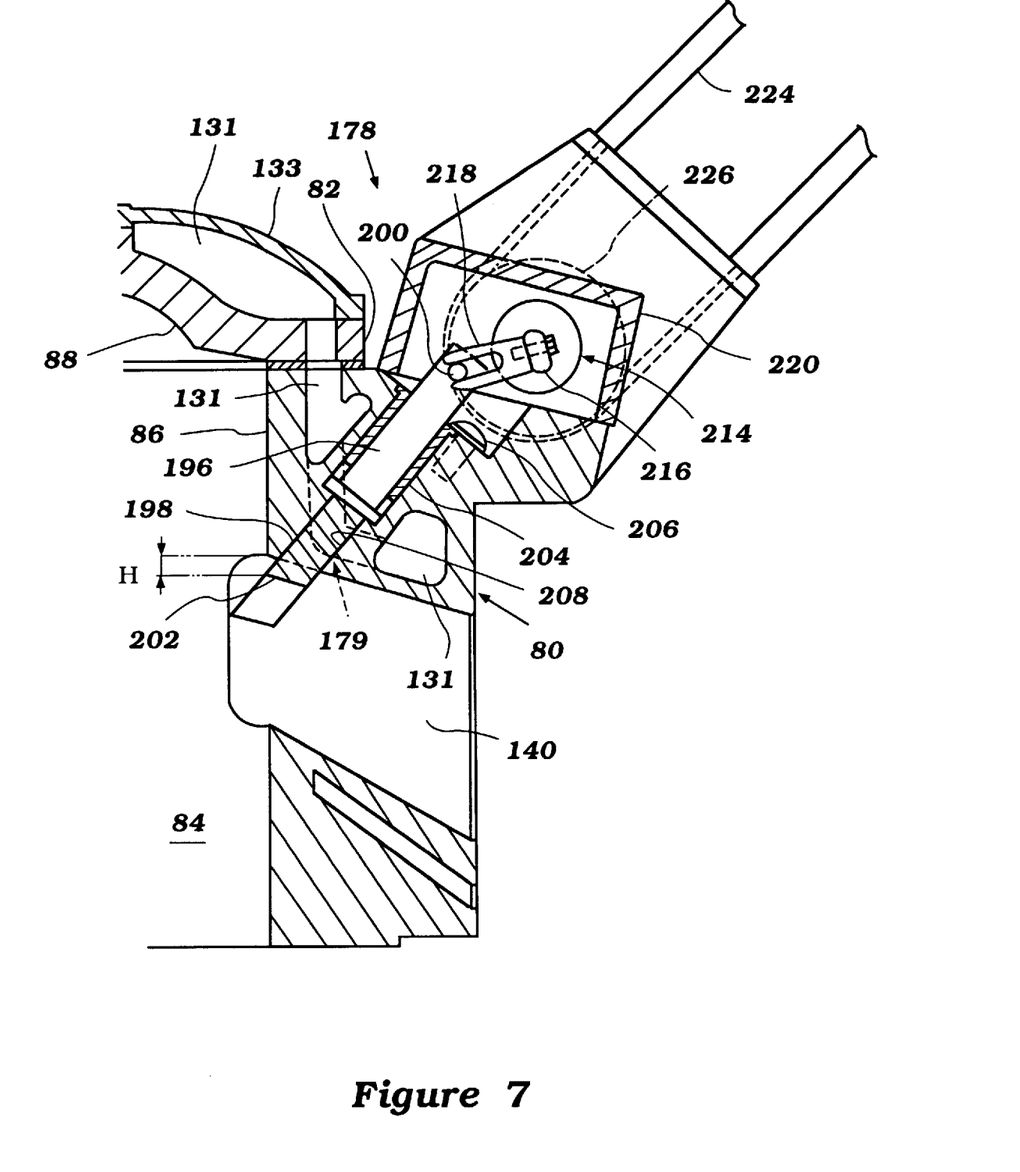
FIG. 7 is a partial cross-sectional view of the engine illustrated in FIG. 3, illustrating an exhaust control in accordance with the present invention.

As illustrated in FIG. 7, the valve 178 is mounted to the block 80. In particular, a guide or passage 208 extends through the block 80 from a top side adjacent the cylinder head 82 into the exhaust chamber 140. The passage includes a narrow portion adjacent the passage 140 in which the plate 196 of the body 179 of the valve 178 is positioned. The passage includes an adjacent enlarged section extending inwardly from the top of the block 80 in which a sleeve bearing 204 is positioned. The sleeve bearing 204 is maintained in position by one or more bolts 206 or similar fasteners. The bearing 204 is sized to slidably accept the stem portion 196 of the body 179 valve 178.

So arranged, the body 179 of the valve 178 is moveable between a first position and a second position. In a first position, the body of the valve 178 is moved downwardly so that the plate 198 extends into the exhaust passage 140, (as illustrated in FIG. 7, the valve body 179 extends into the exhaust passage 140 a distance "H" although this distance may vary, as indicated by the position indicated in phantom) partially blocking it. This has the effect of delaying the time the exhaust starts to pass from the combustion chamber 84 to the exhaust passage 140 (as the piston 90 moves downwardly from top dead center) and has the effect of causing the exhaust to stop flowing earlier (as the piston 90 moves upwardly) as compared to the second position of the valve 178. In the second position, the body 179 (namely the plate 198a) of the valve 178 does not obscure, or at least obscures less as compared to its first position, of the passage 140. In this position, the exhaust flow starts earlier and lasts longer.

As state above, the valve 178 includes means for moving the body 179 between its first and second positions. Preferably, this means comprises an actuating device in the form of a motor 210. In the preferred embodiment of the invention, the motor 210 is mounted remote from the valve body 179, and as such, the means for moving includes a transmission mechanism 211 (see FIG. 3) for transmitting movement of the actuator to the valve 178.

The motor 210 is preferably mounted to an upwardly extending wall section 212 of the hull 26, as illustrated in FIG. 3. Preferably at least this section of the hull 26 comprises a reinforced fiber resin material, so as to serve as a vibration insulator. So as to be readily accessible, the motor 210 is mounted adjacent the opening 60 below the front seat 36. In addition, the motor 210 is positioned near the top of the wall 212 so that in the event water enters the engine compartment 54, the motor 210 is positioned above the water level.

The transmission mechanism 211 includes a shaft 214 mounted for rotation with respect to the cylinder block 80. A shaft 214 extends inwardly from a rear end of the block 80, and a shaft 215 extends inwardly from a front end of the block 80. Each shaft 214,215 has connecting part 216 extending from its end opposite the end of the block 80. The connecting part 216 extends parallel to the shaft 214,215.

An arm 218 extends from the connecting part 216 generally perpendicular thereto. The arm 218 has a slot for accepting the pin 200 extending from the top end of the stem 196. Preferably, each shaft 214,215 is mounted under a cover 220 connected to the top of the block 80.

In addition, and as best illustrated in FIGS. 3, 5 and 7, the transmission mechanism 211 includes a looping cable 224 extending around a motor pulley 222 mounted on an output shaft of the motor and a follower pulley 226 mounted on the end of the shaft 214 corresponding to the valve closest the rear end of the engine 22.

A drive pulley 228 is preferably mounted adjacent the follower pulley 226 on the same shaft 214. A follower pulley 230 is mounted on the other shaft 215 (corresponding to the other valve) and a looping cable 232 extends between the drive pulley 228 and the follower pulley 232.

The transmission mechanism 211 is arranged so that if the motor 210 moves the pulley 222 in a first direction, the cable 224 moves in the same direction, rotation the follower pulley 226. Rotation of the follower pulley 226 causes the shaft 214 to rotate, and the arm 218 to move the pin 200 of the valve 278, and thus the connected valve plate 196. At the same time, when that shaft 214 moves, the drive pulley 228 thereon rotates, causing the cable 232 to rotate. This, in turn, causes the follower pulley 230 on the other shaft 215 to move, causing the valve body 179 to move as described above. Of course, if the motor 210 causes the drive pulley 222 to move in the opposite direction, the valve plates 196 are moved in the opposite direction as well. In this manner, the valve plates 196 are moved between their first and second positions.

A motor control, such as an engine control unit (ECU) is provided for controlling the motor 210 in an appropriate manner so as to control the movement of the valves 178 in relation to the engine speed and load and other characteristics of the engine.

Notably, the transmission mechanism 211 is arranged so that watercraft vibration and hull distortion does not affect the valve actuation. In particular, the slight resiliency of the cables 224,232 and their flexibility serves to prevent vibrations from being transmitted to the motor 210 from the engine 22, or from the watercraft 20 to the engine 22.

As illustrated, the motor 210 is preferably mounted on that side of the hull 26 towards which the engine leans. In this manner, the transmission mechanism spans a short distance, so that only a short cable is necessary. This improves the response between the actuator (motor) and the valve body.

In addition, in order to reduce the transmission of vibrations from the watercraft to the motor 210, the entire hull 26, or preferably at least that portion of the hull to which the motor 210 is mounted, comprises a fiber reinforced resin material. It is also contemplated that other vibration isolating apparatus may be utilized, such as a rubber pad positioned between the motor and the hull.

Figure 9:
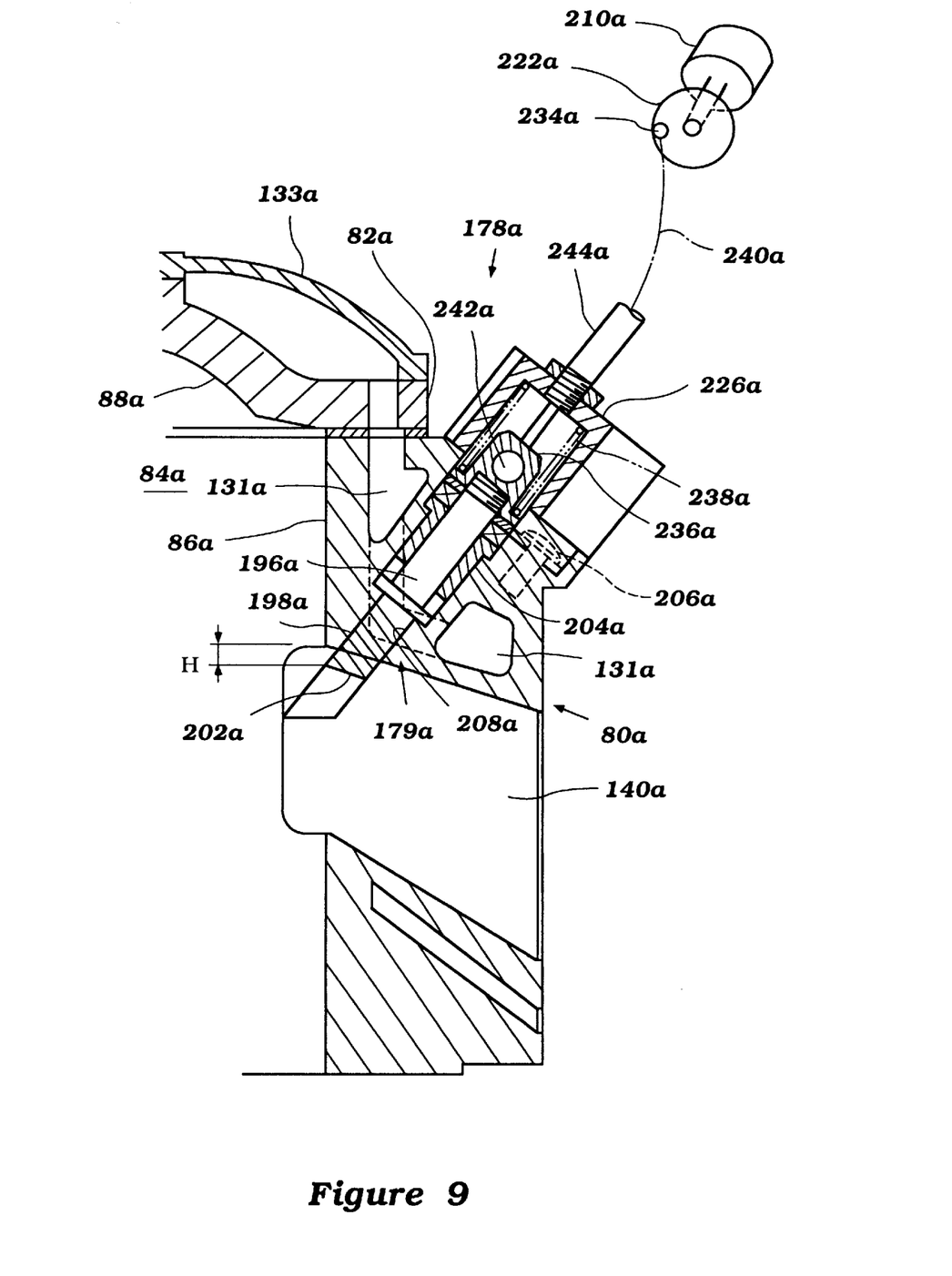
FIG. 9 is a partial cross-sectional view of an engine similar to that illustrated in FIG. 3, illustrating an exhaust control in accordance with a second embodiment of the present invention.

FIG. 9 illustrates a second embodiment of the present invention in which an alternative valve actuating and transmission mechanism is employed. In the description and illustration of this embodiment of the invention, like parts have been given like numerals to those utilized in describing and illustrating the embodiment above, except that an "a" designator has been added thereto.

As illustrated in FIG. 9, the motor 210a is mounted to the watercraft as described above. The motor 210a has a drive pulley 222a with a connecting part 234a connected thereto.

The actuating mechanism comprises a head 236a threadingly mounted to the top end of the stem 196a of the valve 178a. A spring 238a is positioned between the head 236a and the cover 226a for biasing the head 236a, and thus the valve 178a, downwardly towards the exhaust passage 140a.

The transmission mechanism comprises a single cable 240a, or other similar slightly resilient and rather flexible member. The cable 240a is connected at one end to the head 236a via a connecting pin 242a and at the other to the connection part 234a on the pulley 222a of the motor 210a. Preferably, the cable 240a extends through a hollow sleeve 244a connected to the top of the cover 226a and into the space defined by the cover and the top of the cylinder block 80a.

The cable 240a may be branched or a separate cable provided for operating the other valve. Alternatively, in a similar fashion to that describe above, a cable may extend from the first valve to the second valve, whereby movement of the first valve causes the second valve to move.

This embodiment of the invention has similar advantages to those of the first embodiment. In addition, however, because the cable 240a is mounted at its ends and does not loop around pulleys, the risk of cable slippage with respect to the pulleys is eliminated.

Of course, the foregoing description is that of preferred embodiments of the invention, and various changes and modifications may be made without departing from the spirit and scope of the invention, as defined by the appended claims.

What is claimed is:

1. An exhaust control system for a watercraft powered by an internal combustion engine, the watercraft having a hull having a deck section and a lower section herebelow, said deck and lower sections defining an internal chamber, said deck section having an access opening therein leading to said internal chamber, said access opening having an outer edge and selectively covered with a seat, said hull having at least one wall, said engine mounted to said hull in said internal chamber, said engine having a body with at least one combustion chamber with an exhaust passage leading through said body therefrom, said exhaust control system including an exhaust valve for controlling the flow of exhaust through said passage, said valve including a valve body movably mounted with respect to said engine and having a portion for blocking at least a portion of said exhaust passage, and means for moving said body, said means for moving including an actuator positioned at a location on said wall of said hull which is positioned outside of said outer edge of said access opening.

2. The exhaust control system in accordance with claim 1, wherein said valve is of the sliding type.

3. The exhaust control system in accordance with claim 1, wherein said actuator comprises a motor.

4. The exhaust control system in accordance with claim 1, wherein said means for moving includes a transmitter extending between said actuator and said valve body, whereby movement of said actuator is transmitted by said transmitter to said valve body.

5. The exhaust control system in accordance with claim 1, wherein said actuator comprises a motor having a drive pulley mounted on a shaft thereof, and said means for moving includes a follower pulley is connected to said valve body and a looped cable extending around said drive pulley and said follower pulley.

6. The exhaust control system in accordance with claim 5, wherein said valve body has a plate for extension into said exhaust passage and a stem extending from said plate, and wherein said means for moving includes a shaft movably mounted to said engine, said follower pulley mounted to said shaft, and means for moving said stem upon rotation of said shaft.

7. The exhaust control system in accordance with claim 1, wherein said actuator comprises a motor having an output shaft and said means for moving includes a cable connected to said output shaft and to said valve body.

8. The exhaust control system in accordance with claim 7, wherein said valve body has a plate for extension into said exhaust passage and a stem extending from said plate, and wherein said means for moving includes a spring connected to said stem for biasing said body in a first direction.

9. A watercraft having a hull, said hull having a deck section having at least one wall portion which supports a seat, a water propulsion device and an internal combustion engine with an output shaft in driving relation with said water propulsion device, said engine mounted to said hull and having at least one combustion chamber with an exhaust passage leading therefrom for routing exhaust from said combustion chamber, a valve for controlling the flow of exhaust through said exhaust passage, and an actuator for moving said valve, said actuator including a motor mounted to said portion of said wall of said hull which supports said seat.

10. The watercraft in accordance with claim 9, wherein at least that portion of said wall of said hull where said motor is mounted comprises a fiber reinforced resin material.

11. The watercraft in accordance with claim 9, wherein said motor is positioned above said valve with respect to a bottom of said hull.

12. The watercraft in accordance with claim 9, wherein said combustion chamber has a centerline offset from a vertical line, whereby said engine tilts towards a first side of said hull, and wherein said motor is position on said wall comprising said first side of said hull.

13. The watercraft in accordance with claim 9, wherein said valve is of the sliding type.

14. The watercraft in accordance with claim 9, wherein said valve has a plate-like body and a stem extending therefrom, the stem connected to a shaft mounted for rotation with respect to said engine, and including means for rotating the shaft in response to movement of the motor.

15. The watercraft in accordance with claim 14, wherein said engine includes a guide extending therethrough to said exhaust passage, said body movably positioned within said guide.

16. The watercraft in accordance with claim 9, wherein said valve includes a stem and said actuator includes a cable extending from said motor to said stem of said valve.

17. The watercraft in accordance with claim 14, wherein a motor pulley is mounted on an output shaft of said motor and a follower pulley is mounted to said shaft, and wherein said actuator further includes a cable looped around said motor pulley and said follower pulley.

18. An exhaust control system for a watercraft powered by an internal combustion engine, the watercraft having a hull having at least one wall, said hull having a longitudinal axis therethrough, said engine mounted to said hull and having a body defining at least one combustion chamber with an exhaust passage leading through said body therefrom and a crankshaft, said crankshaft extending generally parallel to said longitudinal axis of said hull of said watercraft, said exhaust control system including an exhaust valve for controlling the flow of exhaust through said passage, said valve including a valve positioned to a first side of said longitudinal axis and comprising a body movably mounted with respect to said engine and having a portion for blocking at least a portion of said exhaust passage, and means for moving said body, said means for moving including an actuator positioned on said wall of said hull, said actuator positioned at said first side of said longitudinal axis.

19. The exhaust control system in accordance with claim 18, wherein said combustion chamber has a centerline offset from a vertical line, whereby said engine tilts in a direction towards said first side of said longitudinal axis.

20. The exhaust control system in accordance with claim 18, wherein said valve is of the sliding-type.

21. The exhaust control system in accordance with claim 20, wherein said valve body has a plate for extension into said exhaust passage and a stem extending from said plate, and wherein said means for moving includes a shaft movably mounted to said engine, said follower pulley mounted to said shaft, and means for moving said stem upon rotation of said shaft.

22. An exhaust control system for a watercraft powered by an internal combustion engine, the watercraft having a hull having at least one wall, said engine mounted to said hull and having at least one combustion chamber with an exhaust passage leading therefrom, said exhaust control system including an exhaust valve for controlling the flow of exhaust through said passage, said valve including a valve body movably mounted with respect to said engine and having a portion for blocking at least a portion of said exhaust passage, and means for moving said body, said means for moving including an actuator positioned on said wall of said hull, said actuator comprising a motor having a drive pulley mounted on a shaft thereof, and wherein said means for moving includes a follower pulley is connected to said valve body and a looped cable extending around said drive pulley and said follower pulley.

23. An exhaust control system for a watercraft powered by an internal combustion engine, the watercraft having a hull having at least one wall, said engine mounted to said hull and having a body defining at least one combustion chamber with an exhaust passage leading from said at least one combustion chamber through said body, said exhaust control system including an exhaust valve for controlling the flow of exhaust through said passage, said valve including a valve body movably mounted with respect to said engine and having a portion for blocking at least a portion of said exhaust passage, and a motor connected to said wall of said hull, said motor connected to said valve by a cable, whereby movement of said motor effectuates movement of said valve.

24. The exhaust control system in accordance with claim 23, wherein said valve is of the sliding type.

25. The exhaust control system in accordance with claim 23, wherein a drive pulley is connected to said motor and a driven pulley is connected to said valve and said cable loops around said driven and driven pulleys.

* * * * *

UNITED STATES PATENT AND TRADEMARK OFFICE
CERTIFICATE OF CORRECTION

PATENT NO. : 5,827,096
DATED : October 27, 1998
INVENTOR(S) : Mineo

It is certified that error appears in the above-identified patent and that said Letters Patent is hereby corrected as shown below:

Column 8,
Line 42, change "herebelow" to -- therebelow --.

Signed and Sealed this

Ninth Day of September, 2003

JAMES E. ROGAN
*Director of the United States Patent and Trademark Office*